(12) United States Patent
Teipel et al.

(10) Patent No.: US 11,542,378 B2
(45) Date of Patent: Jan. 3, 2023

(54) HYBRID THERMOPLASTIC COMPOSITES WITH LONG AND SHORT FIBER MATERIALS AND NATURAL NANOPARTICLES

(71) Applicant: ESSENTIUM, INC., Pflugerville, TX (US)

(72) Inventors: Elisa Teipel, Pflugerville, TX (US); Kevin Holder, Houston, TX (US); Nirup Nagabandi, Pflugerville, TX (US); Blake Teipel, Pflugerville, TX (US)

(73) Assignee: Essentium IPCO, LLC, Pflugerville, TX (US)

( * ) Notice: Subject to any disclaimer, the term of this patent is extended or adjusted under 35 U.S.C. 154(b) by 0 days.

(21) Appl. No.: 16/619,008

(22) PCT Filed: Jun. 5, 2018

(86) PCT No.: PCT/US2018/036038
§ 371 (c)(1),
(2) Date: Dec. 3, 2019

(87) PCT Pub. No.: WO2018/226680
PCT Pub. Date: Dec. 13, 2018

(65) Prior Publication Data
US 2021/0079185 A1    Mar. 18, 2021

Related U.S. Application Data

(60) Provisional application No. 62/515,372, filed on Jun. 5, 2017.

(51) Int. Cl.
*C08J 7/04*    (2020.01)
*C08J 5/04*    (2006.01)
*C08J 5/10*    (2006.01)

(52) U.S. Cl.
CPC ............. *C08J 7/0427* (2020.01); *C08J 5/042* (2013.01); *C08J 5/043* (2013.01); *C08J 5/045* (2013.01); *C08J 5/10* (2013.01); *C08J 2323/12* (2013.01)

(58) Field of Classification Search
CPC ........ C08J 2323/12; C08J 5/042; C08J 5/043; C08J 5/045; C08J 5/10; C08J 5/04; C08J 5/06; C08J 5/08; C08J 5/24; B82Y 30/00; C08L 23/12; C08L 1/02; C08K 7/14; C08K 13/08; C08K 3/00; B29B 11/16; B29B 15/08; B29B 15/09; B29B 15/10; B29B 15/12; B29B 15/14
USPC ........... 524/504; 428/461, 462, 295.1, 299.1, 428/299.4; 525/285, 71
See application file for complete search history.

(56) References Cited

U.S. PATENT DOCUMENTS

| | | | |
|---|---|---|---|
| 5,882,745 A | 3/1999 | Mi et al. |
| 6,971,211 B1 | 12/2005 | Zehner |
| 7,365,144 B2 | 4/2008 | Ka et al. |
| 7,459,492 B2 | 12/2008 | Arias Bautista et al. |
| 8,071,677 B2 | 12/2011 | Chen |
| 8,852,488 B2 | 10/2014 | Sain et al. |
| 2017/0027168 A1 | 2/2017 | Heath |

FOREIGN PATENT DOCUMENTS

| | | |
|---|---|---|
| CA | 2435129 C | 1/2010 |
| JP | H06-200169 | 7/1994 |
| JP | 2005213478 A | 8/2005 |
| JP | 2008-248093 A | 10/2008 |
| JP | 2015065829 | 11/2016 |
| JP | 2017066198 A | 4/2017 |
| WO | 2006125035 A2 | 11/2006 |
| WO | 2015195340 A2 | 4/2016 |
| WO | 2016111647 A1 | 7/2016 |
| WO | 2016172207 A1 | 10/2016 |
| WO | 2017004415 A1 | 1/2017 |

OTHER PUBLICATIONS

International Search Report and Written Opinion of PCT/US2018/036038, dated Sep. 17, 2018, 10 pages.
Teipel, Blake "Polymeric Composites With Cellulose Nanomaterials: Development of Synergistic Treatments and Stabilization Schema" Aug. 6, 2016, Retrieved from the Internet: https://oaktrust.library.tamu.edu/handle/1969.1/158111 [retrieved on May 21, 2021].
Search Report in 18812756.7, European Patent Office, dated Feb. 24, 2021.
Search report in 2019-568183, Japanese Patent Office, dated Feb. 21, 2022, 7 pages.

*Primary Examiner* — Camie S Thompson
(74) *Attorney, Agent, or Firm* — Vivacqua Crane, PLLC

(57) ABSTRACT

A thermoplastic composite material includes a thermoplastic polymer matrix component, a microparticle component, a nanoparticle component, and a compatibilizing agent component, at least a portion of the microparticle component and/or nanoparticle component is a natural fiber.

18 Claims, No Drawings

US 11,542,378 B2

HYBRID THERMOPLASTIC COMPOSITES WITH LONG AND SHORT FIBER MATERIALS AND NATURAL NANOPARTICLES

CROSS-REFERENCE TO RELATED APPLICATIONS

This application is a national stage application under 35 USC § 371 of International Application No. PCT/US2018/036038, filed on Jun. 5, 2018, which claims the benefit of U.S. Provisional Application serial number 62/515,372, filed on Jun. 5, 2017, the entire disclosures of which are hereby incorporated by reference.

GOVERNMENT SUPPORT CLAUSE

This invention was made with government support under Contract Number 1560753 awarded by the National Science Foundation. The government has certain rights in the invention.

FIELD

The present disclosure relates generally to thermoplastic composite materials, and more particularly to methods for formulating and producing low-density and semi-natural thermoplastic composites.

BACKGROUND

The statements in this section merely provide background information related to the present disclosure and may or may not constitute prior art.

Composite materials are used in a variety of applications, ranging from body panels and interior trim to structural components of motor vehicles, as well as in a wide range of componentry in other fields. Typical composites include long and short glass fiber filled thermoplastics. Glass being a denser material than thermoplastics, the overall density of a glass fiber composite is higher than the thermoplastic it fills. Increased overall density leads to increased weight which, in vehicle applications can result in reduced fuel efficiency and increased emissions per mile. Long fiber composites, at high loadings, may cause excessive wear to processing equipment, causing increased production costs over time. Additionally, many glass fiber composite materials require significant energy for their preparation and production.

Thus, while current composite materials achieve their intended purpose in motor vehicle applications, there is a need for new and improved methods for producing composite materials that support growing efforts to develop more environmentally friendly or sustainable materials, that improve the mechanical properties and reduce the weight of the composite materials, and that reduce the concentrations of long fibers to reduce abrasion wear on equipment.

SUMMARY

According to several aspects of the present disclosure, a thermoplastic composite material includes a thermoplastic polymer matrix component, a microparticle component, a nanoparticle component, and a compatibilizing agent component. At least a portion of the microparticle component and/or the nanoparticle component is a natural fiber.

According to another aspect of the present disclosure a thermoplastic composite material includes a thermoplastic polymer matrix component, a microparticle component, a nanoparticle component, and a compatibilizing agent component compatibilizing the microparticle component, the nanoparticle component and the thermoplastic polymer matrix component. At least a portion of the microparticle component and or the nanoparticle component is a natural fiber.

In another aspect of the present disclosure the thermoplastic polymer matrix includes a polypropylene (PP) matrix, the microparticle component includes glass fibers, carbon fibers, micron-scale cellulosic fibers, or bast fibers, the nanoparticle component includes glass fibers, carbon fibers, micron-scale cellulosic fibers, or bast fibers, and the compatibilizing agent includes maleic anhydride modified polypropylene (MAPP) and diethylenetriamine (DETA).

In yet another aspect of the present disclosure the thermoplastic composite material includes, by weight percentage, about 80% PP, about 15% glass fiber, about 5% cellulose nanocrystals, and about 0% MAH-Amine, and the thermoplastic composite material has a tensile strength of about 56 MPa, and a tensile modulus of about 3497.35 MPa.

In yet another aspect of the present disclosure the thermoplastic composite material includes, by weight percentage, about 79.3% PP, about 15% glass fiber, about 5% cellulose nanocrystals, and about 0.7% MAH-Amine, and the thermoplastic composite material has a tensile strength of about 56 MPa, and a tensile modulus of about 4014 MPa.

In yet another aspect of the present disclosure the thermoplastic composite material includes, by weight percentage, about 83,86% PP, about 15% glass fiber, about 1% cellulose nanocrystals, and about 0.14% MAH-Amine, and the thermoplastic composite material has a tensile strength of about 59 MPa, and a tensile modulus of about 3577 MPa.

In yet another aspect of the present disclosure the thermoplastic composite material includes, by weight percentage, about 78.6% PP, about 10% glass fiber, about 10% cellulose nanocrystals, and about 1.4% MAH-Amine, and the thermoplastic composite material has a tensile strength of about 37 MPa, and a tensile modulus of about 2612 MPa.

In yet another aspect of the present disclosure the thermoplastic composite material includes, by weight percentage, about 84.3% PP, about 10% glass fiber, about 5% cellulose nanocrystals, and about 0.7% MAH-Amine, and the thermoplastic composite material has a tensile strength of about 45 MPa, and a tensile modulus of about 2714 MPa.

In yet another aspect of the present disclosure the thermoplastic composite material includes, by weight percentage, about 83.95% PP, about 7.5% glass fiber, about 7.5% cellulose nanocrystals, and about 1.05% MAH-Amine, and the thermoplastic composite material has a tensile strength of about 37 MPa, and a tensile modulus of about 2230 MPa.

In yet another aspect of the present disclosure the thermoplastic composite material includes, by weight percentage, about 86.8% PP, about 7.5% glass fiber, about 5% cellulose nanocrystals, and about 0.7% MAH-Amine, and the thermoplastic composite material has a tensile strength of about 41 MPa, and a tensile modulus of about 2374 MPa.

In yet another aspect of the present disclosure the thermoplastic composite material includes, by weight percentage, about 91.36% PP, about 7.5% glass fiber, about 1% cellulose nanocrystals, and about 0.14% MAH-Amine, and the thermoplastic composite material has a tensile strength of about 40 MPa, and a tensile modulus of about 2010 MPa.

In yet another aspect of the present disclosure the thermoplastic composite material includes, by weight percentage, about 89.4% PP, about 5% glass fiber, about 5% cellulose nanocrystals, and about 0.6% MAH-Amine, and the thermoplastic composite material has a tensile strength of about 41 MPa, and a tensile modulus of about 228 2MPa.

In yet another aspect of the present disclosure the thermoplastic composite material includes, by weight percentage, about 93.86% PP, about 5% glass fiber, about 1% cellulose nanocrystals, and about 0.14% MAH-Amine, and the thermoplastic composite material has a tensile strength of about 39 MPa, and a tensile modulus of about 1990 MPa.

In yet another aspect of the present disclosure the thermoplastic composite material includes, by weight percentage, about 94% PP, about 5% glass fiber, about 1% cellulose nanocrystals, and about 0.0% MAH-Amine, and the thermoplastic composite material has a tensile strength of about 39 MPa, and a tensile modulus of about 1344 MPa.

In yet another aspect of the present disclosure a thermoplastic composite material includes a polypropylene (PP) matrix compounded with cellulosic nanocrystals and glass fibers, complete natural bast fibers, micro-nano cellulose fibers, maleic anhydride modified polypropylene (MAPP), and diethylenetriamine (DETA), the MAPP and DETA compatibilizing the cellulosic nanocrystals, bast fibers, cellulose fibers, and the PP matrix. The bast fibers and micro-nano cellulose fibers are incorporated into the PP matrix by reactive extrusion.

In yet another aspect of the present disclosure during reactive extrusion the MAPP and DETA are used in about a 1:1 ratio.

In yet another aspect of the present disclosure the thermoplastic composite material includes, by weight percentage, about 79. 3% PP, about 15% glass fiber, about 5% cellulose nanocrystals, and about 0.7% MAH-Amine, and the thermoplastic composite material has a tensile strength of about 38 MPa and a tensile modulus of about 2374 MPa.

In yet another aspect of the present disclosure a thermoplastic composite material includes a polypropylene (PP) matrix compounded with a hybrid blend of glass fibers, bast fibers, and micro-nano cellulose fibers, composite nanocellulose filler material, maleic anhydride modified polypropylene (MAPP), and diethylenetriamine (DETA), the MAPP and DETA compatibilizing the cellulosic nanocrystals, bast fibers, cellulose fibers, and the PP matrix. The bast fibers, glass fibers, long glass fibers, and micro-nano cellulose fibers are incorporated into the PP matrix, amine groups interact with oxide groups on the glass fibers.

In yet another aspect of the present disclosure the thermoplastic composite material includes, by weight percentage, about 89.3% PP, about 5% long glass fiber, about 5% cellulose nanocrystals, and about 0.7% MAH-Amine, and the thermoplastic composite material has a tensile strength of about 37 MPa, and a tensile modulus of about 2164 MPa.

In yet another aspect of the present disclosure the thermoplastic composite material includes, by weight percentage, about 93.86% PP, about 5% long glass fiber, about 1% cellulose nanocrystals, and about 0.14% MAH-Amine, the thermoplastic composite material has a tensile strength of about 38 MPa, and a tensile modulus of about 1909 MPa.

In yet another aspect of the present disclosure the thermoplastic composite material includes, by weight percentage, about 94.0% PP, about 5% long glass fibers, about 1% cellulose nanocrystals, and about 0.0% MAH-Amine, and the thermoplastic composite material has a tensile strength of about 40 MPa, and a tensile modulus of about 1994 MPa.

Further areas of applicability will become apparent from the description provided herein. It should be understood that the description and the specific examples are intended for purposes of illustration only and are not intended to limit the scope of the present disclosure.

DETAILED DESCRIPTION

The following description is merely exemplary in nature and not intended to limit the present disclosure, application, or uses.

A thermoplastic composite material and method for making the same is generally disclosed herein. In several aspects, the thermoplastic composite material is preferably used with a motor vehicle, for example a passenger vehicle, truck, sport utility vehicle, van, motor home, motorcycle, or any other type of vehicle, etc. For the purposes of this disclosure the thermoplastic composite material will generally be described as applying to a motor vehicle such as one of the above. However it should be appreciated that the thermoplastic composite material of the present disclosure may be used in any of a variety of commercial products and industries including, but not limited to: automotive, aviation, construction, and additive manufacturing.

The thermoplastic composite material of the present disclosure is, more specifically, a low-density, semi-natural thermoplastic composite having both nanoparticle and microparticle fillers. When combined, the nanoparticle and microparticle fillers form composites with both high strength and high stiffness. The composites are formulated appropriately to suit the needs of a product application by adjusting the ratio of nanomaterials to micromaterials used in the thermoplastic matrix. In several aspects, nanomaterials generally refer to sustainable cellulosic nanomaterials such as nanocrystals and nanofibrils. These nanomaterials provide reduced density, increased rigidity and increased strength relative to traditional composite materials. The reduced density, increased rigidity and increased strength provided by the nanoparticles is complimented by microparticle fillers such as glass fibers, carbon fibers, micron-scale cellulosic fibers (such as bast fibers collected from the phloem of a plant) and the like. Combining the nanoparticles with microparticles allows the thermoplastic composites of this disclosure to achieve equivalent or superior properties at lower total filler loadings than composites with only microparticle fillers. It should be appreciated that while the thermoplastic composite materials of the present disclosure are described as having reduced density, increased rigidity, and increased strength, depending on the application and need, the composition of the composite (that is, the weight percentages of the thermoplastic composite material's constituent components) may vary. Additional mechanical advantages may be achieved by varying the weight percentages of the thermoplastic composite material's constituent components without departing from the scope or intent of the present disclosure.

The thermoplastic composite material includes a thermoplastic polymer matrix, a microparticle, and a nanoparticle. In one aspect, the thermoplastic composite material also includes a compatibilizing agent. In other aspects, the thermoplastic composite material may include various other components, such as, for example, rheology modifiers, surfactants, catalysts, plasticizers, water scavengers or desiccants, antioxidants, fillers, colorants, UV absorbers, and stabilizers, the composition by weight of each of which may be adjusted.

The thermoplastic polymer matrix includes polyethylene, polyamide, polyester, polyethers, polylactic acid or polylactide, polyurethane, or combinations thereof. Chemical derivatives of thermoplasts may also be employed in the composition without departing from the scope of the present disclosure. In one example, the thermoplastic polymer matrix may constitute between about 30% and about 94.9% of the overall thermoplastic composite material by weight. In another example, the thermoplastic polymer matrix may constitute between about 55% and about 93% of the overall thermoplastic composite material by weight. In a further example, the thermoplastic polymer matrix may constitute between about 75% and about 84% of the overall thermoplastic composite material by weight.

The microparticles may include long or short glass fibers, carbon fibers, cellulosic fibers such as bast fibers, kevlar fibers, or bamboo fibers, and the like, as well as combinations thereof. The microparticles provide relatively low cost strength to the thermoplastic composite material. In one example, the microparticles are present in an amount between about 5% and about 50% by weight of the thermoplastic composite material. In another example, the microparticles are present in an amount between about 5% and about 30% by weight of the thermoplastic composite material. In a further example, the microparticles are present in an amount between about 10% and about 15% by weight of the thermoplastic composite material.

The nanoparticles are preferably selected from sustainable or "green" nanoparticles that provide strength with relatively low weight. The nanoparticles include cellulosic nanocrystals, cellulose nanofibrils, or cellulose nanoparticles, as well as combinations thereof. Moreover, the nanoparticles may include micron-scale clusters of such nanoparticles. In one example, the nanoparticles are present in an amount between about 0.1% and about 10% by weight of the thermoplastic composite material. In another example, the nanoparticles are present in an amount between about 1% and about 7.5% by weight of the thermoplastic composite material. In a further example, the nanoparticles are present in an amount between about 3% and about 5% by weight of the thermoplastic composite material.

The compatibilizing agent is selected to pair between the polymer matrix, the microparticles, and the nanoparticles. Pairing between the polymer matrix, the microparticles, and the nanoparticles involves the utilization of molecules to graft the thermoplastic matrix to the microparticles and the nanoparticles. Examples of suitable compatibilizing agents for use with the present disclosure include functional groups such as amines such as maleic anhydride modified polypropylene (MAPP) and diethylenetriamine (DETA), hydroxyls, carboxylic acids, silanes, and combinations thereof. Alternatively, or additionally, pairing may include modified additions to the polymer matrix or particle surfaces. In one example, the compatibilizing agent is present in an amount between about 0% and about 10% by weight of the thermoplastic composite material. In another example, the compatibilizing agent is present in an amount between about 1% and about 7.5% by weight of the thermoplastic composite material. In a further example, the compatibilizing agent is present in an amount between about 3% and about 5% by weight of the thermoplastic composite material.

A first exemplary embodiment of the thermoplastic composite material includes a polypropylene (PP) matrix compounded with cellulosic nanocrystals and glass fibers using a reactive extrusion process based on maleic anhydride modified polypropylene (MAPP) and diethylenetriamine (DETA) to act as a compatibilizer between the nanocellulose and the PP matrix. The mechanical properties of the exemplary embodiment are substantially equivalent to 20% and 30% filled glass fiber PP composites. However, the exemplary embodiment has a reduced total filler concentration and a lighter weight relative to the 20% and 30% filled glass fiber PP composites. Relative to the 20% filled glass fiber PP composite, the first exemplary embodiment achieves an approximately 5% weight savings, and an 8% weight savings relative to the 30% filled glass fiber PP composite. In some aspects, nanocellulose and bast fibers used with the MAPP-DETA reactive extrusion treatment may achieve similar properties to 20% filled glass fiber PP composites while approaching and exceeding 10% weight savings. Similarly, alternate polymer matrices, microparticles, nanoparticles, and compatibilizers may be substituted to achieve and exceed the above described weight savings while achieving and exceeding the mechanical properties of filled glass fiber PP composites. Formulations for the first exemplary embodiment can be designed around a structural property goal and compounded for testing via Association for Testing Materials (ASTM) standards for thermoplastic composites.

In a first example of the first exemplary embodiment, by weight percentage, the thermoplastic composite material includes about 80% PP, 15% glass fiber, 5% cellulose nanocrystals, and 0% MAH-Amine. According to ASTM D638 standards, the first example has a tensile strength of approximately 56.19 MPa with a standard deviation of 0.29, and a tensile modulus of approximately 3497.35 MPa with a standard deviation of 48.21.

In a second example of the first exemplary embodiment, by weight percentage, the thermoplastic composite material includes about 79.3% PP, 15% glass fiber, 5% cellulose nanocrystals, and 0.7% MAH-Amine, According to ASTM D638 standards, the second example has a tensile strength of approximately 56.61 MPa with a standard deviation of 1.00, and a tensile modulus of approximately 4014.33 MPa with a standard deviation of 95.44.

In a third example of the first exemplary embodiment, by weight percentage, the thermoplastic composite material includes about 83.86% PP, 15% glass fiber, 1% cellulose nanocrystals, and 0.14% MAH-Amine. According to ASTM D638 standards, the third example has a tensile strength of approximately 59.30 MPa with a standard deviation of 0.46, and a tensile modulus of approximately 3577.50 MPa with a standard deviation of 72.65.

In a fourth example of the first exemplary embodiment, by weight percentage, the thermoplastic composite material includes about 78.6% PP, 10% glass fiber, 10% cellulose nanocrystals, and 1.4% MAH-Amine, According to ASTM D638 standards, the fourth example has a tensile strength of approximately 37.65 MPa with a standard deviation of 1.18, and a tensile modulus of approximately 2612.09 MPa with a standard deviation of 103.83.

In a fifth example of the first exemplary embodiment, by weight percentage, the thermoplastic composite material includes about 84.3% PP, 10% glass fiber, 5% cellulose nanocrystals, and 0.7% MAH-Amine, According to ASTM D638 standards, the fifth example has a tensile strength of approximately 44.65 MPa with a standard deviation of 0.35, and a tensile modulus of approximately 2714.11 MPa with a standard deviation of 28.89.

In a sixth example of the first exemplary embodiment, by weight percentage, the thermoplastic composite material includes about 83.95% PP, 7.5% glass fiber, 7.5% cellulose nanocrystals, and 1.05% MAH-Amine. According to ASTM D638 standards, the sixth example has a tensile strength of approximately 37.14 MPa with a standard deviation of 0.43, and a tensile modulus of approximately 2230.31 MPa with a standard deviation of 69.81.

In a seventh example of the first exemplary embodiment, by weight percentage, the thermoplastic composite material includes about 86.8% PP, 7.5% glass fiber, 5% cellulose nanocrystals, and 0.7% MAH-Amine, According to ASTM D638 standards, the seventh example has a tensile strength of approximately 41.28 MPa with a standard deviation of 0.23, and a tensile modulus of approximately 2374.28 MPa with a standard deviation of 56.94.

In an eighth example of the first exemplary embodiment, by weight percentage, the thermoplastic composite material includes about 91.36% PP, 7.5% glass fiber, 1% cellulose nanocrystals, and 0.14% MAH-Amine. According to ASTM D638 standards, the eighth example has a tensile strength of approximately 39.94 MPa with a standard deviation of 0.22, and a tensile modulus of approximately 2009.75 MPa with a standard deviation of 45.18.

In a ninth example of the first exemplary embodiment, by weight percentage, the thermoplastic composite material includes about 89.4% PP, 5% glass fiber, 5% cellulose nanocrystals, and 0.6% MAH-Amine, According to ASTM D638 standards, the ninth example has a tensile strength of approximately 41.05 MPa with a standard deviation of 0.26, and a tensile modulus of approximately 2282.41 MPa with a standard deviation of 43.54.

In a tenth example of the first exemplary embodiment, by weight percentage, the thermoplastic composite material includes about 93,86% PP, 5% glass fiber, 1% cellulose nanocrystals, and 0.14% MAH-Amine. According to ASTM D638 standards, the tenth example has a tensile strength of approximately 39.27 MPa, and a tensile modulus of approximately 1990.01 MPa.

In an eleventh example of the first exemplary embodiment, by weight percentage, the thermoplastic composite material includes about 94% PP, 5% glass fiber, 1% cellulose nanocrystals, and 0% MAH-Amine, According to ASTM D638 standards, the eleventh example has a tensile strength of approximately 38.74 MPa with a standard deviation of 0.50, and a tensile modulus of approximately 1943.76 MPa with a standard deviation of 26.26.

Overall, the weight percentages of the four components that make up each example of the first embodiment are optimized to meet the standards of thermoplastic composites across many applications and industries including but not limited to: automotive, aviation, construction, and additive manufacturing.

In a second exemplary embodiment, the thermoplastic composite material uses complete natural fibers which are bast fibers and micro-nano cellulose into a PP matrix, In the first example (hereinafter the "complete natural composite") cellulosic fibers such as bast fibers and nanocellulose are incorporated into a PP matrix via reactive extrusion. During reactive extrusion, maleic anhydride polypropylene (MAPP) acts as a compatibilizer and diethylenetriamine (DETA) acts as a linker. According to the strength requirements of the final part, quantities of all the components are pre-calculated before feeding into a twin screw extruder. Typically, a 1:1 ratio of DETA to MAPP is used to realize the amine chemistry which replaces the anhydride with amide and leaves the other amine groups to interlink to hydroxyl groups on the fillers. In specific applications, different ratios can be can also be employed. The composite is obtained as a filament out of the extruder. The composite is then pelletized and can be used to injection mold.

In a first example of the second exemplary embodiment, by weight percentage, the thermoplastic composite material includes about 79.3% PP, 15% bast fiber, 5% cellulose nanocrystals, and 0.7% MAH-Amine links. According to ASTM D638 standards, the first example has a tensile strength of approximately 37.75 MPa with a standard deviation of 0.41, and a tensile modulus of approximately 2373.77 MPa with a standard deviation of 57.27.

In a third exemplary embodiment, the thermoplastic composite material uses a hybrid blend of glass fibers, bast fibers, and micro-nano cellulose in various ratios. In the third exemplary embodiment (hereinafter the "hybrid composite"), composite nanocellulose is used as filler in addition to glass fibers into a PP matrix. The same procedure as what is used to produce complete natural composite is followed except the fillers are different. Also, similar chemistry is expected with respect to these fillers except that the amine groups now interact with oxide groups on the glass fiber fillers. In several respects, hybrid composites may provide a gradual shift step for the composites industry as the technology moves from glass-fiber composites to complete natural composites.

In a first example of the third exemplary embodiment, by weight percentage, the thermoplastic composite material includes about 89.3% PP, 5% long glass fiber, 5% cellulose nanocrystals, and 0.7% MAH-Amine links. According to ASTM D638 standards, the first example has a tensile strength of approximately 37.29 MPa with a standard deviation of 0.87, and a tensile modulus of approximately 2163.98 MPa with a standard deviation of 29.95.

In a second example of the third exemplary embodiment, by weight percentage, the thermoplastic composite material includes about 93.86% PP, 5% long glass fiber, 1% cellulose nanocrystals, and 0.14% MAH-Amine links. According to ASTM D638 standards, the second example has a tensile strength of approximately 38.30 MPa with a standard deviation of 0.27, and a tensile modulus of approximately 1909.16 MPa with a standard deviation of 41.18.

In a third example of the third exemplary embodiment, by weight percentage, the thermoplastic composite material includes about 94.0% PP, 5% long glass fiber, 1% cellulose nanocrystals, and 0% MAH-Amine links. According to ASTM D638 standards, the third example has a tensile strength of approximately 39.90 MPa with a standard deviation of 0.28, and a tensile modulus of approximately 1994.45 MPa with a standard deviation of 50.56.

In both the second and third exemplary embodiments, amine chemistry is used to interlink the fillers with the matrix and improve compatibility. Furthermore, the formulations of both the first and second examples are prepared to meet the industry standards for 20% and 30% glass fiber filled composites which save 5% and 8% weight respectively. But, varying the ratios and optimizing the filler and chemistry content may increase the weight savings by upwards of 10%. Additionally, by optimizing the process and the screw profile on the extruder, additional weight savings may be realized, Overall, the ratios can be changed and optimized to meet the standards of several thermoplastic composites in various industries like auto, aviation, construction and additive manufacturing.

In one aspect the thermoplastic composite material can replace glass fiber filled PP composites currently used in the automotive industry. Using the thermoplastic composite material, comparable mechanical properties can be achieved with a lighter weight composite, reducing final production part weight and leading to an increase in vehicle fuel efficiency The ability to design custom lightweight composites with equivalent properties of high loading microparticle filters, such as glass fiber PP composites offers several advantages. Lighter weights can be achieved by reducing the loading of the microparticle filter, or by substituting a microparticle filler having a low concentration of nanoparticles to compensate for the loss of certain mechanical properties. The nanoparticles are used in lower concentrations and are of a lower density, thereby making the overall composite weigh less. In the example of the automotive industry, as little as a 5% reduction in vehicle weight can result in a 2% improvement in fuel efficiency. Furthermore, using natural materials, such as cellulosic nanoparticles also supports growing efforts to develop more environmentally friendly materials. Cellulosic materials, at both the nano and micro scale, provide sustainable opportunities to improve mechanical properties of composites and have lower energy of preparation than other common fibers such as glass fibers. Additionally, long fiber composites at high loadings cause excessive wear on processing equipment, thereby increasing production costs over time. The addition of nanoparticles allows the use of lower concentrations of long fibers, reducing abrasion wear on equipment.

Thus, while current composite materials and methods for producing the same achieve their intended purpose, there is a need for new and improved methods for producing composite materials, and for new and improved composite materials that improve or maintain structural rigidity, and strength characteristics while reducing density, weight, and the amount of energy required for production. Additionally, there is a need for composite materials that use at least partially renewable and/or sustainable constituent components that reduce overall cost both financially and environmentally.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A thermoplastic composite material comprising:
    a thermoplastic polypropylene polymer matrix component present between about 75% and about 94.9% by weight of the thermoplastic composite material;
    a microparticle component comprising glass fibers present between about 5% and about 15% by weight of the thermoplastic composite material;
    a nanoparticle component comprising cellulose nanocrystals present between about 0.1% and about 10% by weight of the thermoplastic composite material; and
    a compatibilizing agent component optionally present between about 0.1% to about 10% by weight of the thermoplastic composite material compatibilizing the microparticle component, the nanoparticle component and the thermoplastic polymer matrix component,
    the compatibilizing agent comprising maleic anhydride modified polypropylene (MAPP) and diethylenetriamine (DETA).

2. The thermoplastic composite material of claim 1 comprising, by weight percentage:
    about 80% polypropylene; about 15% glass fiber;
    about 5% cellulose nanocrystals; and
    0% compatibilizing agent,
    wherein the thermoplastic composite material has a tensile strength of about 56 MPa, and a tensile modulus of about 3497 MPa.

3. The thermoplastic composite material of claim 1 comprising by weight percentage:
    about 79.3% polypropylene; about 15% glass fiber;
    about 5% cellulose nanocrystals; and
    about 0.7% compatibilizing agent,
    wherein the thermoplastic composite material has a tensile strength of about 56 MPa, and a tensile modulus of about 4014 MPa.

4. The thermoplastic composite material of claim 1 comprising by weight percentage:
    about 83.86% polypropylene; about 15% glass fiber;
    about 1% cellulose nanocrystals; and
    about 0.14% compatibilizing agent,
    wherein the thermoplastic composite material has a tensile strength of about 59 MPa, and a tensile modulus of about 3577 MPa.

5. The thermoplastic composite material of claim 1 comprising by weight percentage:
    about 78.6% polypropylene; about 10% glass fiber;
    about 10% cellulose nanocrystals; and
    about 1.4% compatibilizing agent ,
    wherein the thermoplastic composite material has a tensile strength of about 37 MPa, and a tensile modulus of about 2612 MPa.

6. The thermoplastic composite material of claim 1 comprising by weight percentage:
    about 84.3% polypropylene; about 10% glass fiber;
    about 5% cellulose nanocrystals; and
    about 0.7% compatibilizing agent,
    wherein the thermoplastic composite material has a tensile strength of about 45 MPa, and a tensile modulus of about 2714 MPa.

7. The thermoplastic composite material of claim 1 comprising by weight percentage:
    about 83.95% polypropylene; about 7.5% glass fiber;
    about 7.5% cellulose nanocrystals; and
    about 1.05% compatibilizing agent,
    wherein the thermoplastic composite material has a tensile strength of about 37 MPa, and a tensile modulus of about 2230 MPa.

8. The thermoplastic composite material of claim 1 comprising by weight percentage:
    about 86.8% polypropylene; about 7.5% glass fiber;
    about 5% cellulose nanocrystals; and
    about 0.7% compatibilizing agent,
    wherein the thermoplastic composite material has a tensile strength of about 41 MPa, and a tensile modulus of about 2374 MPa.

9. The thermoplastic composite material of claim 1 comprising by weight percentage:
    about 91.36% polypropylene; about 7.5% glass fiber;
    about 1% cellulose nanocrystals; and
    about 0.14% compatibilizing agent,
    wherein the thermoplastic composite material has a tensile strength of about 40 MPa, and a tensile modulus of about 2010 MPa.

10. The thermoplastic composite material of claim 1 comprising by weight percentage:
    about 89.4% polypropylene; about 5% glass fiber;
    about 5% cellulose nanocrystals; and
    about 0.6% compatibilizing agent,
    wherein the thermoplastic composite material has a tensile strength of about 41 MPa, and a tensile modulus of about 2282 MPa.

11. The thermoplastic composite material of claim 1 comprising by weight percentage:
    about 93.86% polypropylene; about 5% glass fiber;
    about 1% cellulose nanocrystals; and
    about 0.14% compatibilizing agent, wherein the thermoplastic composite material has a tensile strength of about 39 MPa, and a tensile modulus of about 1990 MPa.

12. The thermoplastic composite material of claim 1 comprising by weight percentage:
    about 94% polypropylene; about 5% glass fiber;
    about 1% cellulose nanocrystals; and
    0.0% compatibilizing agent,
    wherein the thermoplastic composite material has a tensile strength of about 39 MPa, and a tensile modulus of about 1344 MPa.

13. The thermoplastic composite material of claim 1 comprising by weight percentage:
    about 89.3% polypropylene; about 5% glass fiber;
    about 5% cellulose nanocrystals; and
    about 0.7% compatibilizing agent,
    wherein the thermoplastic composite material has a tensile strength of about 37 MPa, and a tensile modulus of about 2164 MPa.

14. The thermoplastic composite material of claim 1 comprising by weight percentage:
    about 93.86% polypropylene; about 5% glass fiber;
    about 1% cellulose nanocrystals; and about 0.14% compatibilizing agent,
    wherein the thermoplastic composite material has a tensile strength of about 38 MPa, and a tensile modulus of about 1909 MPa.

15. The thermoplastic composite material of claim 1 comprising by weight percentage:
    about 94.0% polypropylene; about 5% glass fibers;
    about 1% cellulose nanocrystals; and 0.0% compatibilizing agent,
    wherein the thermoplastic composite material has a tensile strength of about 40 MPa, and a tensile modulus of about 1994 MPa.

16. A thermoplastic composite material comprises:
    a polypropylene (PP) matrix present between about 30% and about 94.9% by weight of the thermoplastic composite material;
    cellulosic nanocrystals present between about 0.1% and about 10% by weight of the thermoplastic composite material;
    bast fibers present between about 5% and about 50% by weight of the thermoplastic composite material; and
    maleic anhydride modified polypropylene (MAPP) and diethylenetriamine (DETA) present in the range of between about 0% and about 10% by weight, the MAPP and DETA compatibilizing the cellulosic nanocrystals, bast fibers, and the polypropylene matrix,
    wherein the bast fibers and the cellulosic nanocrystals are incorporated into the polypropylene matrix by reactive extrusion.

17. The thermoplastic composite material of claim 16 wherein during reactive extrusion the MAPP and DETA are used in about a 1:1 ratio.

18. The thermoplastic composite material of claim 16 comprising by weight percentage:
    about 79.3% polypropylene; about 15% bast fiber;
    about 5% cellulose nanocrystals; and
    about 0.7% maleic anhydride modified polypropylene (MAPP) and diethylenetriamine (DETA),
    wherein the thermoplastic composite material has a tensile strength of about 38 MPa and a tensile modulus of about 2374 MPa.

* * * * *